(12) United States Patent
Hauler

(10) Patent No.: US 6,991,299 B2
(45) Date of Patent: Jan. 31, 2006

(54) VEHICLE WHEEL ASSEMBLY AND CLADDING THEREFORE

(75) Inventor: Gregory R. Hauler, Montague, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 10/781,004

(22) Filed: Feb. 18, 2004

(65) Prior Publication Data

US 2005/0179312 A1    Aug. 18, 2005

(51) Int. Cl.
*B60B 7/06* (2006.01)

(52) U.S. Cl. ............................... 301/37.43; 301/37.11; 301/37.106

(58) Field of Classification Search .......... 301/37.101, 301/37.11, 37.43, 37.106, 37.371, 37.31, 301/37.34, 37.372, 37.35, 37.36

See application file for complete search history.

(56) References Cited

U.S. PATENT DOCUMENTS

| | | | |
|---|---|---|---|
| 2,738,233 A * | 3/1956 | Lyon | 301/37.372 |
| 2,809,076 A * | 10/1957 | Plotkin | 301/37.31 |
| 2,848,277 A * | 8/1958 | Lyon | 301/37.35 |
| 3,051,529 A * | 8/1962 | Lyon | 301/37.372 |
| 3,726,566 A | 4/1973 | Beith | |
| 4,316,637 A | 2/1982 | Reynolds et al. | |
| 4,530,542 A | 7/1985 | Spiegel et al. | |
| 4,976,497 A * | 12/1990 | Post et al. | 301/37.43 |
| 5,031,965 A * | 7/1991 | Buerger | 301/37.371 |
| 5,031,966 A | 7/1991 | Oakey | |
| 5,188,428 A * | 2/1993 | Carter, III | 301/37.11 |
| 5,368,370 A | 11/1994 | Beam | |
| 5,435,631 A | 7/1995 | Maloney et al. | |
| 5,458,401 A | 10/1995 | Baccman | |
| 5,461,779 A | 10/1995 | Beam | |
| 5,564,791 A | 10/1996 | Chase et al. | |
| 5,577,809 A | 11/1996 | Chase | |
| 5,595,423 A | 1/1997 | Heck et al. | |
| 5,597,213 A | 1/1997 | Chase | |
| 5,630,654 A | 5/1997 | Chase | |
| 5,636,906 A | 6/1997 | Chase | |
| 5,651,590 A | 7/1997 | Word | |
| 5,664,845 A | 9/1997 | Maloney et al. | |
| 5,722,735 A * | 3/1998 | Wright et al. | 301/37.372 |
| 5,820,225 A | 10/1998 | Ferriss et al. | |
| 5,829,843 A | 11/1998 | Eikhoff | |
| 5,842,750 A | 12/1998 | Murray et al. | |
| 5,845,973 A | 12/1998 | Chase | |
| 5,921,634 A | 7/1999 | Eikhoff | |
| 6,007,158 A | 12/1999 | Maloney et al. | |

(Continued)

*Primary Examiner*—Russell D. Stormer
(74) *Attorney, Agent, or Firm*—Price, Heneveld, Cooper, DeWitt & Litton, LLP

(57) ABSTRACT

A wheel cladding assembly includes a wheel having a disk and a rim complementary to the disk, wherein the disk and the rim include and outer surface, and wherein the rim includes an outer edge extending circumferentially about the rim. The wheel assembly also includes a ring-shaped flange member, and a wheel cladding member having a central portion and an outer periphery complementary to the central portion, wherein the outer periphery includes a circumferentially-extending channel that receives the flange member therein. The channel member is operably coupled to the wheel such that the central portion of the cladding member is aligned with at least a portion of the disk of the wheel, the periphery of the cladding member is aligned with at least a portion of the rim of the wheel, and the channel of the wheel cladding is located substantially proximate the outer edge of the rim.

51 Claims, 3 Drawing Sheets

U.S. PATENT DOCUMENTS

| | | |
|---|---|---|
| 6,068,350 A | 5/2000 | Baumgarten et al. |
| 6,082,829 A | 7/2000 | Chase |
| 6,200,411 B1 | 3/2001 | Eikhoff et al. |
| 6,209,204 B1 | 4/2001 | Eikhoff |
| 6,270,167 B1 | 8/2001 | Kemmerer et al. |
| 6,279,230 B1 | 8/2001 | Eikhoff et al. |
| 6,286,908 B1 | 9/2001 | Maloney et al. |
| 6,346,159 B1 | 2/2002 | Chase et al. |
| 6,386,642 B2 | 5/2002 | Maloney et al. |
| 6,406,100 B1 | 6/2002 | Kinstler |
| 6,460,938 B1 | 10/2002 | Baumgarten |
| 6,481,804 B2 | 11/2002 | Tanghetti |
| 6,502,308 B1 | 1/2003 | Carfora et al. |
| 2001/0006091 A1 | 7/2001 | Eikhoff et al. |
| 2001/0045769 A1 | 11/2001 | Maloney et al. |
| 2002/0050735 A1 | 5/2002 | Tanghetti |
| 2002/0050736 A1 | 5/2002 | Maloney et al. |
| 2002/0093242 A1 | 7/2002 | Chase et al. |
| 2002/0153763 A1 | 10/2002 | Van Houten |
| 2002/0185908 A1 | 12/2002 | Woelfel |
| 2003/0015912 A1 | 1/2003 | Chase |

* cited by examiner

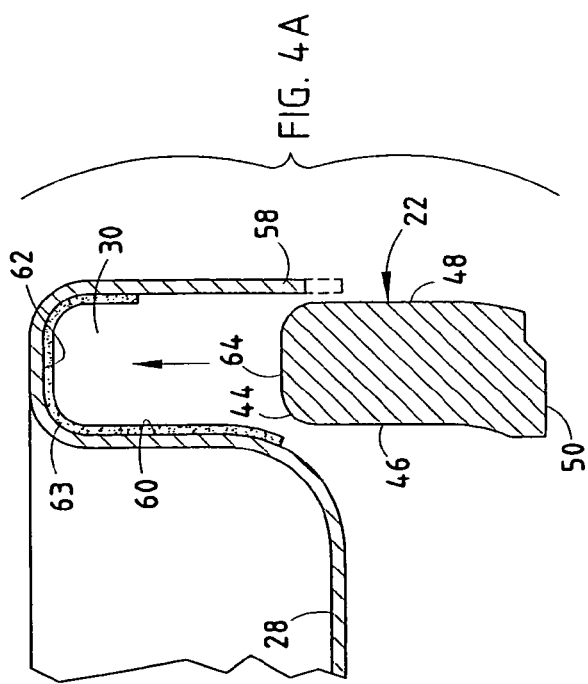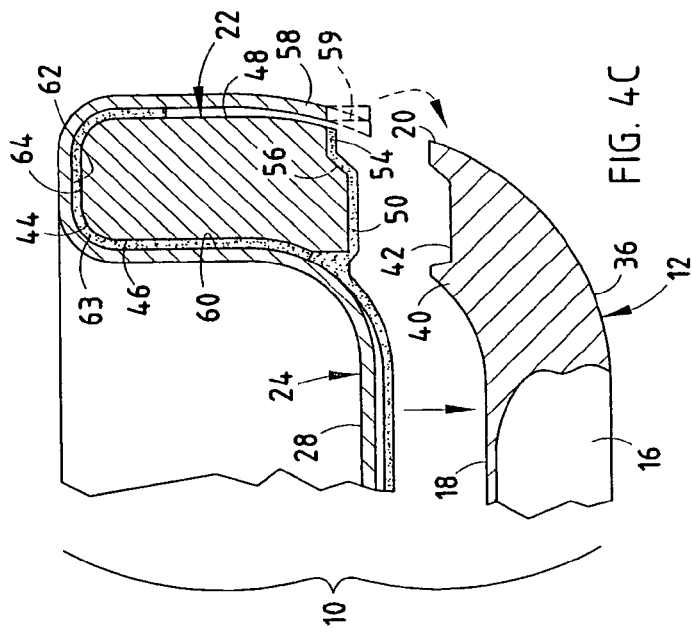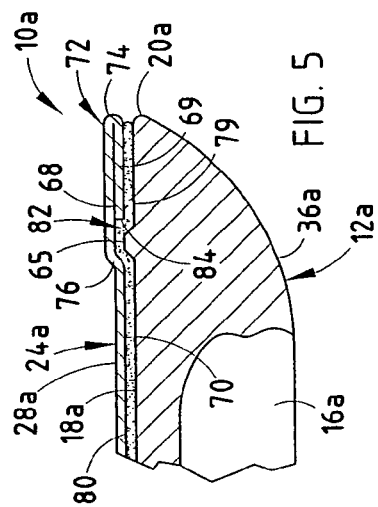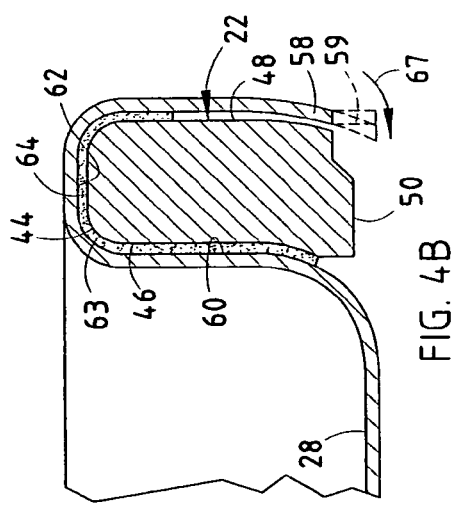

VEHICLE WHEEL ASSEMBLY AND CLADDING THEREFORE

BACKGROUND OF THE INVENTION

The present invention relates to a vehicle wheel assembly and cladding therefore, and in particular to a cladding configuration adaptable for use with a flangeless vehicle wheel.

Ornamental outer coverings have been employed for providing a decorative surface to the exposed surface of a vehicle wheel for many years. The use of outer coverings offer design flexibility in various design configurations that may be used to cover a single-style wheel. In certain applications, the ornamental wheel covering is constructed of a polymeric material or plastic that is then coated with a metal plating. U.S. Pat. Nos. 5,564,791; 5,577,809; 5,597,213; 5,630,654; 5,636,906; 5,845,973; and 6,085,829, the disclosures of which are incorporated herein by reference, represent different approaches for providing and attaching such claddings to existing wheels to provide a decorative appearing wheel.

Heretofore, stainless steel has been used in a wide variety of outer coverings due to corrosion resistance, relative cost, and the flexibility it offers in the design of the associated coverings. Similarly, preferred materials such as steel and aluminum have been used in a wide variety of vehicle wheel designs due to the strength, relative cost and adaptability these materials offer. However, previous designs of these outer coverings and vehicle wheels require significant expenditure during manufacture in order to incorporate certain details. Specifically, previous wheel designs require the casting of complex geometries and/or significant machining in order to form certain details such as the wheel flange.

Therefore, a vehicle wheel assembly is desired that includes a cladding that is adaptable to be used with steel or aluminum wheels that do not include an integrally-forged, casted and/or machined outer flange. Further, these claddings should be long-lasting, corrosion resistant, relatively inexpensive to manufacture, and relatively easy to form into required configurations.

SUMMARY OF THE INVENTION

One aspect of the present invention is to provide a wheel assembly that includes a wheel having a disk and a rim complementary to the disk, wherein the disk and the rim include an outer surface, and wherein the rim includes an outer edge extending circumferentially about the rim. The wheel assembly also includes a ring-shaped flange member, and a wheel cladding member having a central portion and an outer periphery complementary to the central portion, wherein the outer periphery includes a circumferentially-extending channel that receives the flange member therein. The cladding member is operably coupled to the wheel such that the central portion of the cladding member is aligned with at least a portion of the disk of the wheel, the periphery of the cladding member is aligned with at least a portion of the rim of the wheel, and the channel of the wheel cladding is located substantially proximate to the outer edge of the rim.

Another aspect of the present invention is to provide a wheel cover assembly adapted to cover a vehicle wheel having a disk and a rim complementary to the disk, wherein the disk and the rim each include an outer surface, and wherein the rim includes an outer edge extending circumferentially about the rim. The wheel cover assembly includes a ring-shaped flange member, and a wheel cladding member having a central portion and a outer periphery complementary to the central portion, wherein the outer periphery includes a circumferentially-extending channel that receives the flange portion therein. The cladding member is adapted to be coupled to the vehicle such that the cladding member is aligned with at least a portion of the disk of the wheel, the periphery of the cladding member is aligned with at least a portion of the rim of the wheel, and the flange member is adapted to be located substantially proximate the outer edge of the rim.

Yet another aspect of the present invention is to provide a method for assembling a wheel cover assembly with a vehicle wheel to form a wheel assembly that includes providing a wheel cladding member having a central portion and an outer periphery complementary to the central portion, wherein the outer periphery includes a circumferentially-extending channel. The method also includes providing a ring-shaped flange member, and locating the flange member within the channel of the cladding member. The method further includes providing a vehicle wheel having a disk and a rim complementary to the disk, wherein the disk and the rim include an outer surface, and wherein the rim includes an outer edge extending circumferentially about the rim, and coupling the cladding member with the wheel such that the central portion of the cladding member is aligned with at least a portion of the disk of the wheel, the periphery of the cladding member is aligned with at least a portion of the rim of the wheel, and the channel of the cladding member is located substantially proximate the outer edge of the rim.

Still yet another aspect of the present invention is to provide a wheel assembly that includes a wheel having a disk and a rim complementary to the disk, wherein the disk and the rim include an outer surface, and wherein the rim includes an outer edge extending circumferentially about the rim. The wheel assembly also includes a wheel cladding member having a central portion and an outer periphery complementary to the central portion and a lip portion complementary to the outer periphery, wherein the lip portion folds back substantially against the outer periphery, thereby creating a flangeless hem extending circumferentially about the wheel cladding. The cladding member is operably coupled to the wheel such that the central portion of the cladding member is aligned with at least a portion of the disk of the wheel, and the periphery of the wheel member is aligned with at least a portion of the rim of the wheel.

Another aspect of the present invention is to provide a wheel cladding adapted to cover a vehicle wheel having a disk and a rim complementary to the disk, wherein the disk and the rim include an outer surface, and wherein the rim includes an outer edge extending circumferentially about the rim. The wheel cladding includes a central portion, an outer periphery complementary to the central portion, and a lip portion complementary to the outer periphery, wherein the lip portion folds back substantially against the outer periphery, thereby creating a flangeless hem extending circumferentially about the cladding member. The cladding member is adapted to be coupled to a wheel such that the central portion of the cladding member is aligned with at least a portion of a disk of the wheel, and the outer periphery of the cladding member is aligned with at least a portion of a rim of the wheel.

The present inventive vehicle wheel assembly includes a cladding that is adapted for utilization with an associated vehicle wheel that does not include an outer flange, thereby reducing the costs typically associated with the molding and/or machining processes required to create such a flange. The cladding associated with the vehicle wheel assembly provides an aesthetic outer covering that is long-lasting, corrosion resistant, relatively inexpensive to manufacture, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 4A is an exploded cross-sectional view of a flange separated from a wheel cladding taken through line III—III, FIG. 2, with an alternative tab extension shown in dashed line;

FIG. 4B is a cross-sectional view of the flange inserted into a groove of the wheel cladding, taken through line III—III, FIG. 2 with a tab wrapped about the flange, and the alternative tab extension extending outwardly from the tab;

FIG. 4C is a cross-sectional view of the flange and the wheel cladding assembled with an associated vehicle wheel, taken through line III—III, FIG. 2; and FIG. 5 is a cross-sectional view of a disk and rim area of an alternative embodiment of the vehicle wheel assembly, taken through line III—III, FIG. 2.

DETAILED DESCRIPTION OF THE PREFERRED EMBODIMENTS

Figure 1:
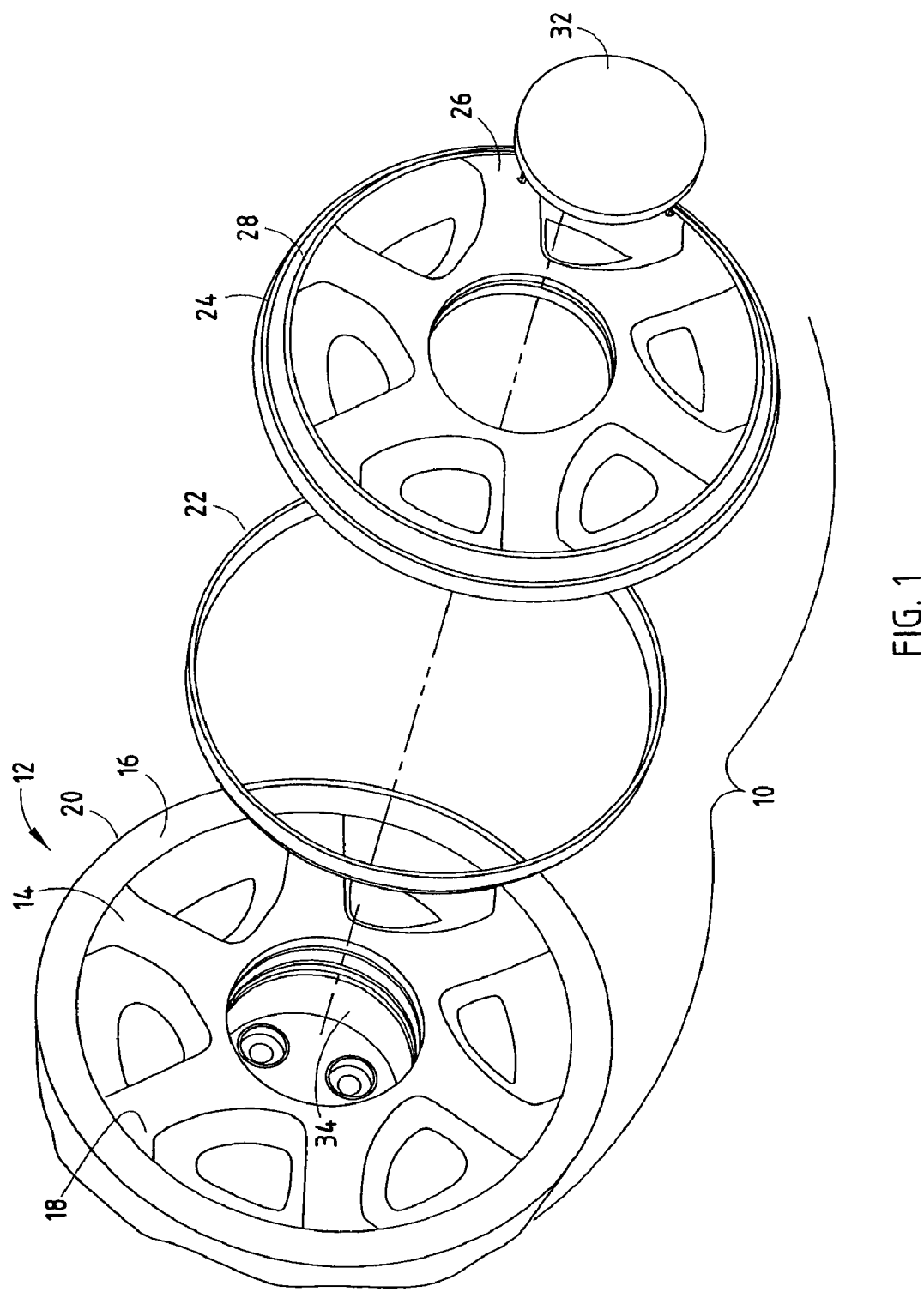
FIG. 1 is an exploded perspective view of a first embodiment of a vehicle wheel assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
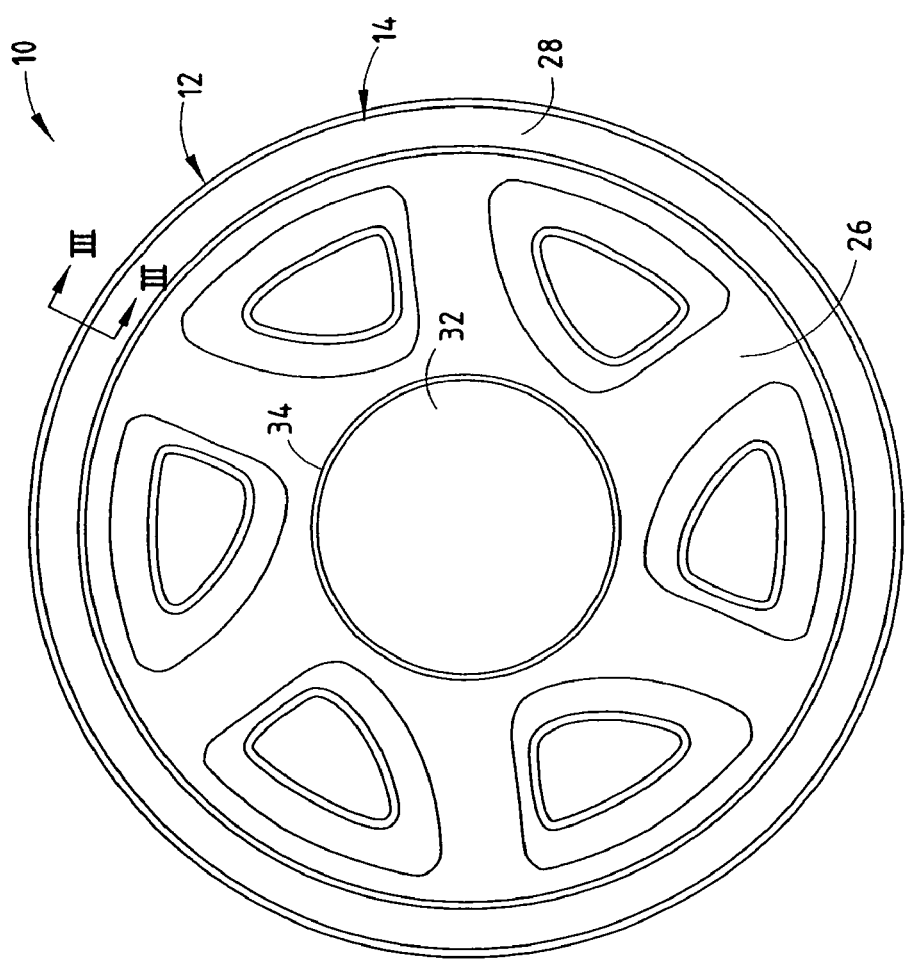
FIG. 2 is a front elevational view of the vehicle wheel assembly.

The reference numeral 10 (FIGS. 1 and 2) generally designates a vehicle wheel assembly embodying the present invention. In the illustrated example, the wheel assembly 10 includes a vehicle wheel 12 having a central disk 14 and a rim 16 complementary to the disk 14. The disk 14 and the rim 16 include an outer surface 18. The rim 16 includes an outer edge 20 extending circumferentially about the rim 16. The wheel assembly 10 also includes a ring-shaped flange member 22, and a wheel cladding member having a central portion 26 and an outer periphery 28, complementary to the central portion 26. The outer periphery 28 includes a circumferentially-extending channel that receives the flange member 22 therein. The cladding member 24 is operably coupled to the wheel 12 such that the central portion 26 of the cladding member 24 is aligned with the disk 14 of the wheel 12, the outer periphery 28 of the cladding member 24 is aligned with the rim 16 of the wheel 12, and the channel 30 of the cladding member 24 is located proximate the outer edge 20 of the rim 16. In the illustrated example, the wheel assembly 10 further includes a center cap 32 that is snappably coupled with the cladding member 24, thereby covering a lug nut well 34 of the wheel 12. However, it should be noted that the cladding member 24 may be provided in various configurations, including those that allow for exposed lug nuts subsequent to the cladding member 24 being coupled with the wheel 12, and configurations that do not include the use of a center cap 24.

Figure 3:
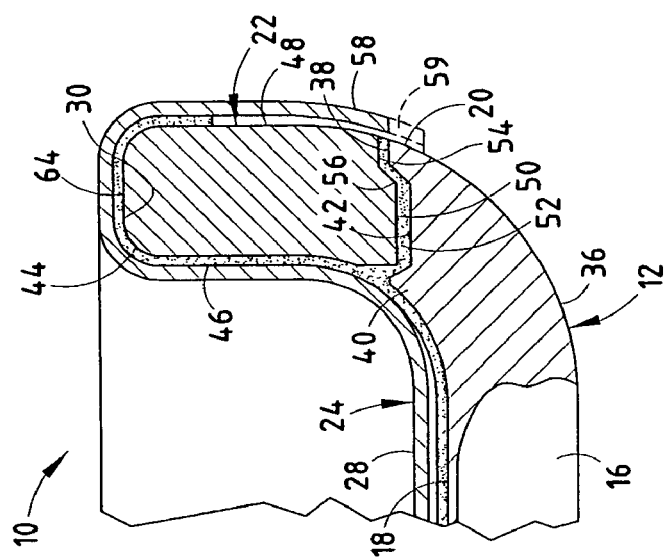
FIG. 3 is a cross-sectional view of a disk and rim area of the vehicle wheel assembly, taken through line III—III, FIG. 2.

The wheel 12 (FIG. 3) is preferably constructed of steel or aluminum, however, other materials suitable for such uses may be utilized. The disk 14 and the rim 16 of the wheel 12 include the outer surface 18 and an inner surface 36. The wheel 12 further includes a circumferentially and outwardly-extending outer tab 38 located proximate the outer edge 20, and an outwardly and circumferentially-extending inner tab 40 located axial inward from the outer tab 38. The outer tab 38 and the inner tab 40 cooperate to form a circumferentially-extending groove 42 located therebetween. While the outer tab 38 and the inner tab 40 are preferably cast-formed within the wheel 12, other techniques may be utilized such as machining, forging, and the like.

The flange member 22 is provided with a substantially U-shaped cross-sectional configuration, and includes a concave first portion 46 facing inwardly toward the central portion 26 of the cladding member 24 when assembled therewith, and a convex second portion 48 facing outwardly away from the central portion 26 of the cladding member 24 when the flange member 22 is assembled with the cladding member 24. The flange member 22 further includes an inner surface 50 facing inwardly toward the rim 16 of the wheel 12 when the cladding member 24 and the flange member 22 are assembled with the wheel 12. The inner surface 50 includes a first portion 52 and a second portion 54 offset from one another by an angled shoulder 56.

The cladding member 24 is preferably constructed of a stainless steel, however, other materials suitable for such application may be utilized therefore. The channel 30 of the cladding member 24 is provided a substantially U-shaped geometrical configuration that closely receives the U-shaped configuration of the flange member 22 therein. Specifically, the channel 30 includes a radially inwardly-located surface 60 extending complimentary to the central portion 26, and an outwardly-located surface 62 extending complimentary to the surface 60. A circumferentially-extending lip portion 58 extends complementary to the surface 62 of the cladding member 24. Alternatively, a lip extension 59 extends complementary to the lip portion 58.

In assembly, an adhesive 63 (FIG. 4A) is placed within the channel 30 prior to locating the flange member 22 therein. Specifically, the radially-inwardly located surface 60 and the outwardly-located surface 62 of the channel 30 are each coated with the adhesive 63. The flange member 22 (FIG. 4B) is then pressed into the channel 30 of the cladding member 24 such that the first portion 46 of the outer surface 44 and an end portion 64 of the outer surface 44 contact the adhesive 63 as previously placed within the channel 30, thereby adhering the flange member 22 to the surfaces 60, 62 of the channel 30. The lip portion 58 of the cladding member 24 is then rolled or curled inwardly in a direction as indicated by directional arrow 67, such that the lip portion 58 curls about the curved second portion 48 of the outer surface 44 of the flange member 22, thereby creating a positive lock between the flange member 22 and the cladding member 24. An inner surface 66 of the cladding member 24 and the inner surface 50 of the flange member 22 are then coated with the adhesive 63. The cladding member 24 with the flange member 22 is then pressed onto the associated wheel 12, thereby securely attaching the cladding member 24 and the flange member 22 with the wheel 12. Proper axial alignment of the cladding member 24 and the flange member 22 with respect to the wheel 12 is provided by the shoulder 56 of the cladding member 24 that axially aligns within the outer tab 38 of the wheel 12. Alternatively, the cladding member 24 and the flange member 22 are secured to the wheel 12 prior to rolling or curling the lip portion 58. In this embodiment, the lip portion 58 is curled subsequent to securing the cladding member 24 and the flange member 22 to the wheel 12, such that when the lip portion 58 curls about the curved second portion 48 of the outer surface 44 of the flange member 22, and such that the lip extension 59 curls about the outer edge 20 of the wheel 12, thereby creating a positive lock between the cladding member 24 and the flange member 22, and a positive lock between the cladding member 22 and the wheel 12.

The reference numeral 10a (FIG. 5) generally designates another embodiment of the present invention. Since the wheel assembly 10a is similar to the previously-described wheel assembly 10, similar parts appearing in FIGS. 1–3 and FIG. 5 are represented by the same, corresponding reference numeral, except for the suffix "a" in the numerals of the latter. The cladding member 24a includes a circumferentially-extending lip 69 complementary to the outer periphery 28a. The lip 69 is turned axially and radially inwardly until an inner surface 68 of the lip 69 contacts an inner surface 70 of the outer periphery 28a, thereby creating a double-thickness hem 72 extending circumferentially about the cladding member 24a and including an outer edge 74. A circumferentially-extending angular shoulder 76 offsets the hem 72 outwardly from a portion of the outer periphery 28a. Specifically, the shoulder 76 preferably offsets the hem 72 from the portion of the outer periphery 28a such that the lip 69 is coplanar with the portion of the outer periphery 28a. Further, the shoulder 72 and the lip 69 are configured so as to provide a gap 82 between a distal end 84 of the lip 69 and the shoulder 72.

In the illustrated example, the wheel 12a includes a circumferentially and outwardly-extending tab 65 that is radially inset from the outer edge 20a of the wheel 12a.

In assembly, the inner surface 80 of the cladding member 24a and/or an outer surface 79 of the lip 69 are coated with an adhesive 80. The cladding member 24a is then pressed onto the wheel 12a and adhered thereto by the adhesive 80. The cladding member 24a is radially positioned with respect to the wheel 12a by locating the tab 65 within the gap 82.

The vehicle wheel assembly as disclosed and described herein includes, among other things, a wheel cover or cladding that is compatible with steel and/or aluminum wheels that do not include forged, cast or machined outer flanges. Moreover, these claddings are preferably constructed of a long-lasting stainless steel or similar alloy, and are therefore corrosion resistant, relatively inexpensive to manufacture, and are relatively easy to form into required configurations.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A wheel assembly, comprising:
   a wheel having a disk and a rim complementary to the disk, the disk and rim including an outer surface, the rim including an outer edge extending circumferentially about the rim;
   a ring-shaped flange member separate from the wheel and complementary to the outer edge extending circumferentially about the rim; and
   a wheel cladding member having a central portion and an outer periphery complimentary to the central portion, the outer periphery including a circumferentially extending channel that receives the flange member therein;
   wherein the cladding member is operably coupled to the wheel such that the central portion of the cladding member is aligned with at least a portion of the disk of the wheel and the outer periphery of the cladding member is aligned with at least a portion of the rim of the wheel, and wherein the channel of the cladding member is located substantially proximate the outer edge of the rim.

2. The wheel assembly of claim 1, wherein the flange member includes an inner surface, the rim of the wheel includes a circumferentially extending groove, and wherein at least a portion of the inner surface of the flange is located within the groove.

3. The wheel assembly of claim 2, wherein the groove is defined between a circumferentially extending first tab located proximate the outer edge of the rim, and a circumferentially extending second tab located radially inward from the first tab.

4. The wheel assembly of claim 3, wherein the inner surface of the flange member includes a first portion and a second portion offset from the first portion, the first portion is located between the first tab and the second tab, and wherein at least part of the second portion is radially co-aligned with a select one of the first tab and the second tab.

5. The wheel assembly of claim 4, wherein at least part of the second portion of the inner surface of the flange member is radially aligned with the first tab of the wheel, and wherein an outer surface of the flange member is aligned with an inner surface of the wheel.

6. The wheel assembly of claim 5, wherein the cladding member includes an annular lip complementary to the outer periphery, and wherein the annular lip is configured to provide a positive lock between the cladding member and the wheel.

7. The wheel assembly of claim 6, wherein the annular lip wraps about the inner surface of the wheel, thereby creating the positive lock.

8. The wheel assembly of claim 1, wherein the cladding member includes an annular lip complementary to the outer periphery, and wherein the annular lip provides a positive lock between the flange member and the cladding member.

9. The wheel assembly of claim 8, wherein the flange member includes a curved outer surface, and wherein the annular lip wraps about the curved outer surface of the flange member, thereby creating the positive lock.

10. The wheel assembly of claim 1, wherein the flange member is coupled with the cladding member by an adhesive.

11. The wheel assembly of claim 1, wherein the cladding member is coupled with the wheel by an adhesive.

12. The wheel assembly of claim 1, wherein the cladding member includes an annular lip complementary to the outer periphery, and wherein the annular lip provides a positive lock between the cladding member and the wheel.

13. The wheel assembly of claim 12, wherein the annular lip wraps about an inner surface of the wheel, thereby creating the positive lock.

14. The wheel assembly of claim 1, wherein the cladding member comprises stainless steel.

15. A wheel cover assembly adapted to cover a vehicle wheel having a disk and a rim complementary to the disk, the disk and rim including an outer surface, the rim including an outer edge extending circumferentially about the rim, the wheel cover assembly comprising:
   a ring-shaped flange member separate from the wheel and adapted to be positioned complementary to an outer edge extending circumferentially about a rim; and
   a wheel cladding member having a central portion and an outer periphery complimentary to the central portion, the outer periphery including a circumferentially extending channel that receives the flange member therein;
   wherein the cladding member is adapted to be coupled to the vehicle wheel such that the central portion of the cladding member is aligned with at least a portion of the disk of the wheel and the periphery of the cladding member is aligned with at least a portion of the rim of the wheel, and wherein the flange member is adapted to be located substantially proximate the outer edge of the rim.

16. The wheel cover assembly of claim 15, wherein the flange member includes an inner surface that is adapted to be closely received within a groove extending circumferentially about the rim of the wheel.

17. The wheel cover assembly of claim 16, wherein the inner surface of the flange member includes a first portion and a second portion offset from the first portion, the first portion is adapted to be located within the groove of the wheel, and wherein at least a part of the second portion is not located within the groove of the wheel.

18. The wheel cover assembly of claim 15, wherein cladding member is configured such that an outer surface of the flange member is adapted to align with an inner surface of the wheel.

19. The wheel cover assembly of claim 18, wherein the cladding member includes an annular lip complementary to the outer periphery, and wherein the annular lip is configured to provide a positive lock between the cladding member and the wheel.

20. The wheel cover assembly of claim 19, wherein the annular lip is adapted to wrap about the inner surface of the wheel, thereby creating the positive lock.

21. The wheel cover assembly of claim 15, wherein the cladding member includes an annular lip complementary to the outer periphery, and wherein the annular lip provides a positive lock between the flange member and the cladding member.

22. The wheel cover assembly of claim 21, wherein the flange member includes a curved outer surface, and wherein the annular lip wraps about the curved outer surface of the flange member, thereby creating the positive lock.

23. The wheel cover assembly of claim 15, wherein the flange member is coupled with the cladding member by an adhesive.

24. The wheel cover assembly of claim 15, wherein the cladding member includes an annular lip complementary to the outer periphery, and wherein the annular lip is configured to provide a positive lock between the cladding member and the wheel.

25. The wheel cover assembly of claim 24, wherein the annular lip is adapted to wrap about an inner surface of the wheel, thereby creating the positive lock.

26. The wheel cover assembly of claim 15, wherein the cladding member comprises stainless steel.

27. A method for assembling a wheel cover assembly with a vehicle wheel to form a wheel assembly, the method comprising:
   providing a wheel cladding member having a central portion and an outer periphery complimentary to the central portion, the outer periphery including a circumferentially extending channel;
   providing a ring-shaped flange member;
   locating the flange member within the channel of the cladding member;
   providing a vehicle wheel having a disk and a rim complementary to the disk, the disk and rim including an outer surface, the rim including an outer edge extending circumferentially about the rim; and
   coupling the cladding member with the wheel such that the central portion of the cladding member is aligned with at least a portion of the disk of the wheel and the periphery of the cladding member is aligned with at least a portion of the rim of the wheel, and such that the channel of the cladding member is located substantially proximate the outer edge of the rim.

28. The method of claim 27, wherein the step of providing the flange member includes providing the flange member with an inner surface, the step of providing the wheel includes providing the rim of the wheel with a circumferentially extending groove, and further including:
   aligning at least a portion of the inner surface of the flange within the groove prior to the coupling step.

29. The method of claim 28, wherein step of providing the cladding member includes providing the cladding member with an annular lip complementary to the outer periphery, and wherein the step of coupling the cladding member with the wheel includes forming the annular lip to provide a positive lock between the cladding member and the wheel.

30. The method of claim 29, wherein step of coupling the cladding member with the wheel includes forming the annular lip about an inner surface of the wheel, thereby creating the positive lock.

31. The method of claim 27, wherein step of providing the cladding member includes providing the cladding member with an annular lip complementary to the outer periphery; and further including:
   coupling the flange member with the cladding member by forming the annular lip to provide a positive lock between the cladding member and the flange member, subsequent to locating the flange member within the channel of the cladding member.

32. The method of claim 31, wherein the step of coupling the flange member to the cladding member is completed prior to coupling the cladding member to the wheel.

33. The method of claim 27, wherein step of providing the cladding member includes providing the cladding member with an annular lip complementary to the outer periphery, and wherein the step of coupling the cladding member with the wheel includes forming the annular lip to provide a positive lock between the cladding member and the wheel.

34. The method of claim 33, wherein step of coupling the cladding member with the wheel includes forming the annular lip about an inner surface of the wheel, thereby creating the positive lock.

35. The method of claim 27, further including:
coupling the flange member with the cladding member by placing an adhesive within the channel of the cladding member prior to locating the flange member within the channel of the cladding member.

36. The method of claim 35, wherein the step of coupling the cladding member with the wheel includes placing an adhesive between the cladding member and the wheel.

37. The method of claim 36, wherein the step of coupling the cladding member with the wheel includes placing an adhesive between the flange member and the wheel.

38. A wheel assembly, comprising:
a wheel having a disk and a rim complementary to the disk, the disk and rim including an outer surface, the rim including an outer edge extending circumferentially about the rim; and
a wheel cladding member having a central portion and an outer periphery complimentary to the central portion and a lip portion complimentary to the outer periphery, wherein the lip portion folds back substantially against the outer periphery such that the outer periphery and the lip portion are substantially coplanar;
wherein the cladding member is operably coupled to the wheel such that the central portion of the cladding member is aligned with at least a portion of the disk of the wheel and the outer periphery of the cladding member is aligned with at least a portion of the rim of the wheel.

39. The wheel assembly of claim 38, wherein the outer periphery of the cladding member includes a circumferentially and outwardly extending shoulder.

40. The wheel assembly of claim 39, wherein the shoulder extends outwardly to a distance substantially similar to a thickness of the lip portion of the cladding member.

41. The wheel assembly of claim 40, wherein the rim of the wheel includes a circumferentially extending tab radially offset from the outer edge of the rim, and wherein the shoulder of the cladding is aligned within the tab, thereby axially aligning the cladding member with the wheel.

42. The wheel assembly of claim 38, wherein the lip portion of the wheel cladding is folded back against the outer periphery, such that an inner surface of the lip portion is in contact with an inner surface of the outer periphery.

43. The wheel assembly of claim 38, wherein the wheel includes a radially-extending shoulder positioned between the outer periphery and the lip portion and wherein the lip portion is located completely radially outward from the shoulder.

44. The wheel assembly of claim 38, wherein the cladding member is coupled with the wheel by an adhesive.

45. The wheel assembly of claim 38, wherein the cladding member comprises stainless steel.

46. A wheel cladding adapted to cover a vehicle wheel having a disk and a rim complementary to the disk, the disk and rim including an outer surface, the rim including an outer edge extending circumferentially about the rim, the wheel cladding comprising:
a central portion;
an outer periphery complimentary to the central portion; and
a lip portion complimentary to the outer periphery, wherein the lip portion folds back substantially against the outer periphery, such that the outer periphery and the lip portion are substantially coplanar;
wherein the cladding member is adapted to be coupled to a wheel such that the central portion of the cladding member is aligned with at least a portion of a disk of the wheel and the outer periphery of the cladding member is aligned with at least a portion of a rim of the wheel.

47. The wheel cover of claim 46, wherein the outer periphery of the cladding member includes a circumferentially and outwardly extending shoulder.

48. The wheel cover of claim 47, wherein the shoulder extends outwardly to a distance substantially similar to a thickness of the lip portion of the cladding member.

49. The wheel cover of claim 48, wherein the shoulder of the cladding member is adapted to aligned within a tab that extends circumferentially about the rim of the wheel and is radially offset from the outer edge of the rim, thereby axially aligning the cladding member with the wheel.

50. The wheel cover of claim 46, wherein the lip portion of the cladding member is folded back against the outer periphery, such that an inner surface of the lip portion is in contact with an inner surface of the outer periphery.

51. The wheel cover of claim 46, wherein the cladding member comprises stainless steel.

* * * * *